United States Patent [19]  [11] 4,146,548
Forsythe  [45] Mar. 27, 1979

[54] ESTERIFICATION RATE IN PRODUCTION OF ACYL LACTYLATE SALTS

[75] Inventor: Curtis J. Forsythe, Raytown, Mo.

[73] Assignee: Top-Scor Products, Inc., Kansas City, Kans.

[21] Appl. No.: 873,001

[22] Filed: Jan. 27, 1978

[51] Int. Cl.² .......................... C09F 5/08; C11C 3/00; C09K 3/00
[52] U.S. Cl. ........................... 260/410.6; 252/188.3 R
[58] Field of Search ............... 260/410.6; 252/188.3 R

[56] References Cited

U.S. PATENT DOCUMENTS

| | | | |
|---|---|---|---|
| 2,733,252 | 1/1956 | Thompson | 260/410.6 X |
| 2,789,992 | 4/1957 | Thompson | 260/410.6 X |
| 3,951,945 | 4/1976 | Heesen et al. | 260/410.6 X |

Primary Examiner—John Niebling
Attorney, Agent, or Firm—Fishburn, Gold & Litman

[57] ABSTRACT

A method of producing, at an improved reaction rate, acyl lactylate salts, such as sodium stearoyl-2-lactylate, calcium stearoyl-2-lactylate and mixtures thereof, which involves the addition of from about 2% to about 30% (by weight of final salt composition) of substantially fully hydrogenated stearin comprising at least 50% (by weight of fatty acid) $C_{18}$ fatty acid and having an iodine value of less than about 7. The intermediate reaction charge is also disclosed.

22 Claims, No Drawings

ESTERIFICATION RATE IN PRODUCTION OF ACYL LACTYLATE SALTS

This invention relates to a method of improving the esterification rate in the production of acyl lactylate salts.

Stearoyl lactylate salts have been produced and sold as items of commerce for many years, being used especially as additives in bakery products. Sodium and calcium stearoyl-2-lactylates are the most common of such salts and their use in products for human consumption is controlled by the United States Food and Drug Administration as set forth in the Food Additive Regulation 21 CFR Section 172.846 and 172.844 respectively and also in 21 CFR Section 136.110, in particular subsection C-15.

As used herewithin the terms sodium and calcium stearoyl lactylate refer to both the laboratory produced and commercial grades of each stearoyl lactylate salt. The commercial grade stearoyl lactylate salts, while controlled as described above, actually encompass a variety of lactylates including those having a wide range of lactyl groups and various fatty acids taken from the acyl group. For example, the stearoyl lactylate salts are generally written as sodium stearoyl-m-lactylate and calcium stearoyl-n-lactylate wherein m and n represent the average number of lactyl groups (polylactyls) present, that is, each m and n represent an average of a range which may extend from 0 to 11 when used as baking additives. Lactylates having 1 to 3 lactyl groups are considered most functional in baking with an average of 2 preferred. In normal nomenclature each m and n is rounded to the nearest whole number, hence, 2 may actually represent a range of 1.51 to 2.50. As used herein a non-decimaled number, such as 2, references a range whereas a decimaled number, such as 2.0 references a specific average number. In addition, commercial grade stearoyl lactyls normally contain a wide range of acyl fatty acid radicals, including those of $C_{14}$ to $C_{22}$ fatty acids, the most common of which are $C_{18}$ and $C_{16}$, along with lessor amounts of $C_{14}$ and the other acids.

Thus, for example, a particular stearoyl lactylate may be made from a stearin fatty acid containing about 50% (by weight of fatty acid) stearic acid and about 50% (by weight of fatty acid) palmitec acid. Therefore as used herein, stearoyl lactylate salts are understood to include the wide range of lactyl groups and various fatty acid substitutions for stearic acid which may be present in commercial stearoyl lactylate salts.

Conventional methods of manufacture of sodium and calcium stearoyl lactylate salts are well known and an example of such is given in Tsen et al U.S. Pat. No. 3,883,669. Thus, for example, sodium stearoyl-2-lactylate may be prepared by: (1) admixing one equivalent of commercial grade stearic acid with about one equivalent of lactylic acid having an average of 2.4 lactyls per lactylic acid equivalent in an aqueous medium at a sufficiently elevated temperature to remain in a molten condition; (2) stirring the mixture with heating, whereupon one equivalent of sodium hydroxide is added; and (3) heating the mixture to bring the temperature thereof up to about 200 degrees centigrade. For the calcium salt, calcium carbonate or calcium hydroxide is substituted for sodium hydroxide in step 2.

It is generally desirable, in any chemical process which is not relatively instantaneous, to find methods of accelerating the reaction. This increased reaction speed reduces total required time per unit weight of production, thereby reducing equipment size requirements and/or increasing total yield for given equipment. This, in turn, substantially reduces cost per unit of production. A second benefit of accelerating a reaction, at least in many reactions requiring heat addition (as does acyl lactylate salt production), is often an allowable reduction in process temperature, with a resultant enjoyment of both reduced heating costs and energy conservation.

A standard method of expressing the reaction speed is termed the specific reaction rate constant, herein referred to as k, which is empirically determined and is a strong function of temperature. Of importance to the present invention is the reaction speed of esterification in the production of the acyl lactylate salts, which is the reaction occurring the step 1 of the conventional production as discussed above and which is illustrated by the following:

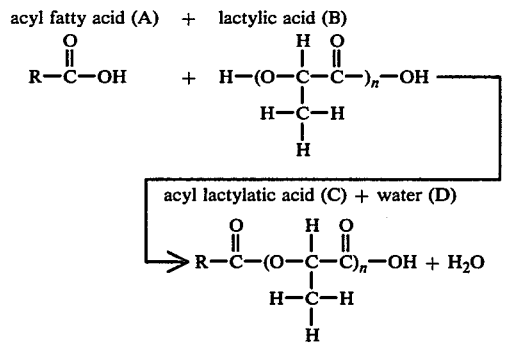

wherein R represents an hydrogenated carbon chain within the range of $C_{13}$ to $C_{21}$ and n represents the number of lactyls within the polylactyl ranging from 1 to 11 as previously discussed. The above reaction may be abbreviated as:

$$A + B \rightarrow C + D$$

Since the above is an esterification process, its rate ($r_e$) is defined by the following second order rate expression:

$$r_e = \frac{dC_C}{dt} = -k(C_A)(C_B)$$

wherein
t = time in seconds
$C_A$ = concentration of A in gram-moles/liter
$C_B$ = concentration of B in gram-moles/liter
$C_C$ = concentration of C in gram-moles/liter From which, through rigorous derivation, can be obtained the integrated form in terms of the acid value as a function of elasped time for a system in which the initial concentrations of A and B are not equal:

$$\log_{10} \frac{(AV)_o^o}{(AV)_o} \left[ \frac{n_o^o B}{n_o^o A} + \frac{(AV)_o}{(AV)_o^o} - 1 \right] \left[ \frac{(AV)_t}{(AV)_t - \left(1 - \frac{n_o^o B}{n_o^o A}\right)(AV)_o^o} \right] = \left( \frac{D_S}{56.108} \right) \left[ \frac{(AV)_o^o \left(1 - \frac{n_o^o B}{n_o^o A}\right)}{\log_e 10} \right] k \Delta t$$

wherein:

$n_o^o B$ = initial number of gram-moles of reactant B
$n_o^o A$ = initial number of gram-moles of reactant A
$(AV)_o^o$ = theoretical acid value of the system before any esterification occurs
$(AV)_o$ = initial measured acid value of the system at reaction temperature, which is defined as occurring at t=o
$(AV)_t$ = measured acid value of the system after any particular elasped time $\Delta t$
$D_S$ = average density of the system in grams per liter from t=o to t=t
$(D_S/56.108)$ = conversion factor between acid value and concentration
$\Delta t$ = elapsed time = t-o The progress of the esterification process is followed by determining the acid value of the system as a function of $\Delta t$ by standard analytical methods. The function:

$$\log_{10} \left[ \frac{(AV)_t}{(AV)_t - \left(1 - \frac{n_o^o B}{n_o^o A}\right)(AV)_o^o} \right]$$

is then plotted against $\Delta t$ and the reaction rate constant (k) is determined from the slope of the resulting straight line. The speed at which a particular reaction progresses for a particular temperature is directly related to the k value for that reaction. Thus k values will be compared herein to determine the effectiveness of the present invention in increasing the apparent rate of esterification in the production of acyl lactylate salts.

Therefore, the principal objects of the present invention are: to provide a method for increasing the apparent rate of esterification in acyl lactylate salts; to provide such a method whereby production is faster and/or occurs at lower temperature than conventional methods of production, with accompanying cost and energy savings; to increase the apparent rate of esterification in such salts by the addition of from about 2% to about 30% (by weight of final lactylate salt composition) fully hydrogenated stearin comprising at least 50% (by weight of fatty acid) $C_{18}$ fatty acid and having an acid value of less than 7; and to provide such a method and reaction charge composition to accomplish the foregoing which is convenient, economical, and particularly well suited for the proposed use.

Other objects and advantages of this invention will become apparent from the following description wherein is set forth by way of example, certain embodiments of this invention.

As required, detailed embodiments and examples of the present invention are disclosed herein. However, it is to be understood that the disclosed embodiments and examples are merely exemplary of the invention which may be embodied in many various forms. Therefore, specific details disclosed herein are not to be interpreted as limiting but merely as a basis for the claims and as a representative basis for teaching one skilled in the art to variously employ the present invention.

The basis for the present invention is the surprising discovery that incorporation of stearin into the initial esterification reaction charge during production of acyl lactylate salts, substantially increases the specific reaction rate constant over conventional production methods of such salts. It has been found that as little as 2% by weight of such stearin addition is effective in the practice of the present invention.

An additional practical and surprising result of the practice of this invention is that the described incorporation of from about 2% to about 30% (by weight of final lactylate salt composition) of hydrogenated stearin decreases the hydroscopicity and increases the resistance to lumping and caking of the resultant salts, when powdered, over conventional powdered acyl lactylate salts. See related copending application Ser. No. 888,224.

As used herein the term "stearin" refers to hydrogenated fats and oils, more specifically to such compositions which are preferably fully hydrogenated, having an iodine value of less than about 7 (preferably 6 or less) and wherein a minimum of about 50% (by weight of fatty acid) is $C_{18}$ fatty acid. This terminology generally agrees with commercial practice. It is understood that the term "fat" refers to triglycerides which are solid or semisolid at normal ambient temperatures and "oil" refers to triglycerides which are liquid at such temperatures. Thus, as used herein, stearin may include a wide variety of triglycerides whose individual fatty acids may range from $C_{12}$ to $C_{24}$, the most common of the fully hydrogenated fatty acids being stearic and palmitic acid. it has been found that the most functional stearins for the present invention are those having high percentages of $C_{18}$ stearic acid. Thus soybean oil stearin, having fatty acids which are in the nature of about 90% (by weight of fatty acid) $C_{18}$ stearic acid, is very functional.

Other hydrogenated vegetable and animal stearins (edible and non-edible) having more than 50% (by weight of fatty acid) $C_{18}$ fatty acid include but are not limited to those of castor oil, cottonseed oil, kapok oil, lard, linseed oil, olive oil, palm oil, peanut oil, rapeseed oil, safflower oil, sunflower oil, tallow, tung oil, many marine oils, and mixtures thereof. While each of the fully hydrogenated stearins mentioned above improve the rate of esterification of acyl lactylate salts, as noted above, those having the highest percentages of $C_{18}$ fatty acid are preferred. For stearoyl lactylate salts used in food products, edible stearins are selected, however, the non-edible stearins are also functional in the practice of the present invention.

The fully hydrogenated stearin is incorporated in the initial charge of lactylic (polylactylic) acid and acyl fatty acid before completion of the esterification reaction. "Initial charge" is intended to mean the simple mixing together of the lactylic acid and acyl fatty acid and although this normally would occur at molten temperatures, it is not so restricted. The incorporation of stearin would also normally, and preferably, occur immediately upon the mixing of the lactylic acid and the acyl fatty acid, the stearin being added with one or both of the acids or being added separately and thus comprising an intermediate charge. The stearin may be added at some time after the mixing of both acids but before completion of the esterification reaction; however, it is preferred to incorporate the stearin as soon as possible since the longer the time period before addition of the stearin, the less effective becomes the reaction, as apparently only that part of the esterification occurring after the stearin addition can benefit from the reaction rate increase.

SUMMARY

It has been discovered that the incorporation of stearin comprising at least 50% (by weight of fatty acid) $C_{18}$ fatty acid and having an iodine value of less than about 7 into an initial charge of lactylic acid and acyl fatty acid, produces a surprising increase in the rate of esterification in the production of acyl lactylate salts. It is preferred to incorporate the stearin immediately upon the mixing of the two acids together.

PRACTICE OF THE INVENTION

The optimum amount of stearin used may be based upon current economic factors wherein the value of the stearin is balanced against savings in production due to decreased reaction time and/or reduced energy requirements.

The invention is shown by examples to be effective in the commonly produced lactylate salts, that is sodium stearoly-2-lactylate, calcium stearoyl-2-lactylate and mixtures thereof.

The examples which follow serve to illustrate the preparation of several stearoyl lactylate salts according to this invention and the benefits derived therefrom.

In each of the examples the values for the specific reaction rate constant (k) where determined under similar conditions and, in particular, at the same temperature (200° Centigrade), so that the various k values are comparable. The value for each k was specifically determined by measuring the decline in the concentration of the reactants in the esterification reaction, as measured by a decrease in acid values as a function of time and using established kinetics practices.

EXAMPLE I

Sodium stearoyl-2-lactylate samples were prepared by conventional methods except that fully hydrogenated soybean oil stearin containing about 90% (by weight of fatty acid) $C_{18}$ fatty acid and having an iodine number of less than 7 was incorporated into the esterification reaction initial charge with the stearic acid and lactylic acid in the following amounts by weight of such stearin in the final lactylate salt product: 0.0%, 2.5%, 5%, 10%; 15%, 20% and 30%. The value of k was determined as previously discussed for each sample and the results are tabulated in Table I.

COMPARATIVE ESTERIFICATION RATE CONSTANTS FOR SODIUM STEAROYL-2 LACTYLATE AS A FUNCTION OF INCREASING LEVELS OF SOYBEAN OIL STEARIN

| Sample # | % by Weight of Hydrogenated Soybean Oil Stearin in Final Product | k (l./mole-sec.) [all values multiplied by 10⁴] | % of Increase |
|---|---|---|---|
| 1 | 0 | 1.9667 | — |
| 2 | 2.5 | 2.1030 | 6.93 |
| 3 | 5.0 | 2.2415 | 13.97 |
| 4 | 10.0 | 2.3862 | 21.33 |
| 5 | 15.0 | 2.4428 | 24.21 |
| 6 | 20.0 | 2.5380 | 29.05 |
| 7 | 30.0 | 2.5564 | 29.98 |

The data in Table I demonstrate the functionality of increasing apparent esterification rate as measured by k at levels as low as 2.5% by weight of hydrogenated soybean oil stearin in the final product. Each additional increment of the stearin increases the value of k. At a level of about 30% by weight of the stearin in the final product, the increase in the value of k becomes smaller, such that additional stearin would have only a minor effect on increasing the apparent esterification reaction rate.

EXAMPLE II

Calcium stearoyl-2-lactylate samples were prepared by conventional methods except that hydrogenated soybean oil stearin containing about 90% (by weight of fatty acid) $C_{18}$ fatty acid and having an iodine number of less than 7 was incorporated into the esterification reaction charge with the stearic acid and the lactylic acid in the following amounts by weight of such stearin in the final lactylate sale product: 0.0%, 10%, 20%, 30%. The value of k was determined as previously discussed for each sample and the results are recorded in Table II.

TABLE II

COMPARATIVE ESTERIFICATION RATE CONSTANTS FOR CALCIUM STEAROYL-2 LACTYLATES AS A FUNCTION OF INCREASING LEVELS OF SOYBEAN OIL STEARIN

| Sample # | % by Weight of Hydrogenated Soybean Oil Stearin in Final Product | R (l./mole-sec.) [all values multiplied by 10⁴] | % of Increase |
|---|---|---|---|
| 1 | 0 | 1.0781 | — |
| 2 | 10 | 1.1763 | 9.11 |
| 3 | 20 | 1.1575 | 7.37 |
| 4 | 30 | 1.1850 | 9.92 |

The data in Table II demonstrate the functionality of increasing the apparent esterification rate as measured by k in stearoyl lactylate salts of calcium and in particular calcium stearoyl-2-lactylate. While the increment in the value of k for various levels of such soybean oil stearin addition to the calcium salts is not as great as in the sodium salts, the increase in the calcium salt is, nevertheless, significant.

EXAMPLE III

Samples of a mixed stearoyl lactylate salt composition were prepared by conventional methods except that hydrogenated soybean oil stearin containing about 90% (by weight of fatty acid) $C_{18}$ fatty acid and having an iodine number of less than 7 was incorporated into the esterification reaction charge with the stearic acid and lactylic acid in the following amounts: 0% and 10%. The mixed stearoyl lactylate salt final composition contained sodium and calcium stearoyl-2-lactylate in such a mixture that the equivalence ratio of sodium to calcium in the final product was 1:1, that is, approximately 23 weight equivalents of sodium were present for each 20 weight equivalents of calcium. The value of k was determined as previously discussed for each sample and the results are recorded in Table III.

Table III

COMPARATIVE ESTERIFICATION RATE CONSTANTS FOR MIXED SODIUM AND CALCIUM STEAROYL-2-LACTYLATES AS A FUNCTION OF INCREASED LEVELS OF HYDROGENATED SOYBEAN OIL STEARIN

| Sample # | % by Weight of Hydrogenated Soybean Oil Stearin in Final Product | k (1./mole-sec.) [all values multiplied by $10^4$] | % of Increase |
|---|---|---|---|
| 1 | 0 | 1.5328 | — |
| 2 | 10 | 1.7830 | 16.52 |

The data of Table III demonstrate the functionality of increasing the apparent esterification rate as measured by k in mixed stearoyl lactylate salt compositions and in particular compositions containing sodium and calcium stearoyl-2-lactylate wherein the equivalence ratio of sodium to calcium is 1:1.

EXAMPLE IV

In order to determine functionality of fully hydrogenated stearin containing only about 50% (by weight of fatty acid) $C_{18}$ fatty acid, samples of sodium stearoyl-2-lactylate, calcium stearoyl-2-lactylate, and a mixed sodium and calcium stearoyl-2-lactylate composition wherein the equivalence ratio of sodium to calcium was 1:1, were prepared. Conventional methods were used as previously noted, except palm oil stearin having about 50% (by weight of fatty acid) $C_{18}$ fatty acid (Ashland Chemical Bulletin No. 1170) was incorporated into the esterification reaction charge in amounts as shown in Table IV. The value for k was determined for each sample as previously discussed and the results are tabulated in Table IV.

Table IV

COMPARATIVE ESTERIFICATION RATE CONSTANTS FOR SODIUM AND CALCIUM STEAROYL-2-LACTYLATES AND MIXTURES THEREOF AS A FUNCTION OF INCREASING LEVELS OF PALM OIL STEARIN

| Sample | # | % by Weight of Hydrogenated Palm Oil Stearin in Final Product | k (1./mole-sec.) [all values multiplied by $10^4$] | % of Increase |
|---|---|---|---|---|
| sodium stearoyl-2-lactylate | 1 | 0 | 1.9667 | — |
|  | 2 | 10 | 2.3958 | 21.82 |
| calcium stearoyl-2-lactylate | 1 | 0 | 1.0781 | — |
|  | 2 | 10 | 1.1752 | 9.00 |
| mixed sodium and calcium stearoyl-2-lactylate (equivalence ratio of Na:Ca is 1:1) | 1 | 0 | 1.5328 | — |
|  | 2 | 10 | 1.7771 | 15.94 |

The data of Table IV demonostrate the functionality of hydrogenated Palm oil stearin containing as little as 50% (by weight of fatty acid) $C_{18}$ fatty acid in substantially increasing the esterification reaction rate constant (k) in sodium and calcium stearoyl-2-lactylate and mixtures thereof.

It is to be understood that while certain forms of this invention have been described, it is not to be limited thereto, except insofar as such limitations are included in the claims.

Having thus described the invention, what is claimed and desired to secure by Letters Patent is:

1. A method for producing an acyl lactylate salt which includes:
    (a) an esterification reaction step occurring after an intial charge of a lactylic acid and an acyl fatty acid, and
    (b) the incorporation of from about 2% to about 30% of stearin prior to completion of said esterification step;
    (c) said stearin containing at least about 50% (by weight of fatty acid) $C_{18}$ fatty acid.
2. The method according to claim 1 wherein:
    (a) said stearin is substantially fully hydrogenated.
3. The method according to claim 1 wherein:
    (a) said stearin has an iodine value of less than about 7.
4. The method according to claim 1 wherein:
    (a) said salt is a stearoyl lactylate salt.
5. The method according to claim 1 wherein:
    (a) said salt is a stearoyl-2-lactylate salt.
6. The method according to claim 1 wherein:
    (a) said salt is sodium stearoyl-2-lactylate.
7. The method according to claim 1 wherein:
    (a) said salt is calcium stearoyl-2-lactylate.
8. The method according to claim 1 wherein:
    (a) said salt is a mixture of sodium and calcium stearoyl-2-lactylate.
9. The method according to claim 2 wherein:
    (a) said stearin is selected from the group consisting of stearins of caster oil, corn oil, cottonseed oil, herring oil, kopok oil, lard, linseed oil, palm oil, peanut oil, olive oil, safflower oil, rapeseed oil, sardine oil, soybean oil, sunflower oil, tallow, tung oil, and mixtures thereof.
10. The method according to claim 2 wherein:
    (a) said stearin is fully hydrogenated soybean oil stearin.
11. The method according to claim 2 wherein:
    (a) said stearin is fully hydrogenated palm oil stearin.
12. The method according to claim 1 wherein:
    (a) said stearin comprises at least 50% (by weight of fatty acid) $C_{18}$ fatty acid and substantially all remaining fatty acid is a $C_{16}$ fatty acid.
13. An intermediate charge for use in the production of acyl lactylate salt comprising:
    (a) a major portion of a lactylic acid,
    (b) a major portion of an acyl fatty acid, and
    (c) about 2% to about 30% of stearin containing at least about 50% (by weight of fatty acid) $C_{18}$ fatty acid.
14. The intermediate charge according to claim 13 wherein:
    (a) said stearin is substantially fully hydrogenated.
15. The intermediate charge according to claim 13 wherein:
    (a) said stearin has an iodine value of less than about 7.
16. The intermediate charge according to claim 13 wherein:
    (a) said salt is a stearoyl lactylate salt.
17. The intermediate charge according to claim 13 wherein:
    (a) said salt is a stearoyl-2-lactylate salt.
18. The intermediate charge according to claim 13 wherein:
    (a) said salt is sodium stearoyl-2-lactylate.
19. The intermediate charge according to claim 13 wherein:
    (a) said salt is calcium stearoyl-2-lactylate.
20. The intermediate charge according to claim 13 wherein:

(a) said salt is a mixture of sodium and calcium stearoyl-2-lactylate.

21. The intermediate charge according to claim 13 wherein:
 (a) said stearin is hydrogenated sobyean oil stearin.

22. The intermediate charge according to claim 13 wherein:
 (a) said salt is selected from the group consisting of sodium stearoyl-2-lactylate, calcium stearoyl-2-lactylate and mixtures thereof; and
 (b) said stearin is selected from the group consisting of hydrogenated soybean oil, palm oil, and mixtures thereof.